(12) United States Patent
Raizen et al.

(10) Patent No.: US 8,775,861 B1
(45) Date of Patent: Jul. 8, 2014

(54) NON-DISRUPTIVE STORAGE DEVICE MIGRATION IN FAILOVER CLUSTER ENVIRONMENT

(75) Inventors: Helen S. Raizen, Jamaica Plain, MA (US); Cesareo Contreras, Northbridge, MA (US); Michael E. Bappe, Loveland, CO (US); Edward L. Thigpen, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 191 days.

(21) Appl. No.: 13/535,740

(22) Filed: Jun. 28, 2012

(51) Int. Cl.
*G06F 11/00* (2006.01)
(52) U.S. Cl.
USPC .......................................... 714/4.12; 714/6.3
(58) Field of Classification Search
USPC ................. 714/4.11, 4.12, 6.3, 6.32, 16
See application file for complete search history.

(56) References Cited

U.S. PATENT DOCUMENTS

| | | | | |
|---|---|---|---|---|
| 5,835,954 A * | 11/1998 | Duyanovich et al. | ......... | 711/162 |
| 6,145,066 A * | 11/2000 | Atkin | ............................ | 711/165 |
| 6,598,134 B2 * | 7/2003 | Ofek et al. | ..................... | 711/162 |
| 6,832,289 B2 * | 12/2004 | Johnson | ........................ | 711/112 |
| 7,080,221 B1 * | 7/2006 | Todd et al. | ..................... | 711/161 |
| 7,093,088 B1 * | 8/2006 | Todd et al. | ..................... | 711/162 |
| 7,237,079 B2 * | 6/2007 | Kaneda et al. | ................ | 711/162 |
| 7,770,053 B1 | 8/2010 | Bappe et al. | | |
| 7,809,912 B1 | 10/2010 | Raizen et al. | | |
| 7,904,681 B1 | 3/2011 | Bappe et al. | | |
| 8,577,836 B2 * | 11/2013 | Kopylovitz et al. | .......... | 707/609 |
| 2004/0080558 A1 * | 4/2004 | Blumenau et al. | .............. | 347/19 |
| 2006/0069862 A1 * | 3/2006 | Kano | ............................ | 711/114 |
| 2013/0080827 A1 * | 3/2013 | Kaushik et al. | ................ | 714/6.3 |
| 2013/0198561 A1 * | 8/2013 | Fleming et al. | ................ | 714/6.3 |
| 2013/0262921 A1 * | 10/2013 | Gao et al. | ..................... | 714/6.24 |

* cited by examiner

*Primary Examiner* — Marc Duncan
(74) *Attorney, Agent, or Firm* — BainwoodHuang (57) ABSTRACT

A method of performing data migration from a source storage device to a target storage device in a failover cluster includes use of a roll-forward flag to signal successful completion of a migration operation from a migration node to failover nodes of the cluster, reliably controlling host access to the target storage device to ensure that it is used only when it has been successfully synchronized to the source storage device and a commit operation has occurred that ensures that subsequent read and write operations are directed exclusively to the target storage device.

14 Claims, 5 Drawing Sheets

NON-DISRUPTIVE STORAGE DEVICE MIGRATION IN FAILOVER CLUSTER ENVIRONMENT

BACKGROUND

The present invention relates to migration of data from a source data storage device to a target data storage device in a data processing system.

Data migration techniques are used to move or "migrate" data from one storage device (or logical unit) to another for any of a variety of purposes, such as upgrading storage hardware or information lifecycle management. Generally, migration involves synchronizing the source device to the target device, i.e., achieving an operating state in which the target device stores the same data as the source device, and then switching operation so that subsequent accesses are directed to the target device instead of the source device. Once the switching is successfully accomplished, the source device can be taken out of service or put to some other use.

Non-disruptive migration is performed while there is ongoing application-level accesses to the source storage device. In non-disruptive migration, there are two parts to achieving synchronization—the data has to be copied from source to target, and any application write operations occurring while the copying is in progress have to be synchronized with the copying and, in general, "cloned", i.e., sent to both source and target devices. Example descriptions of non-disruptive migration can be found in the following US patents, whose entire contents are incorporated by reference herein:
1. U.S. Pat. No. 7,904,681 Methods and systems for migrating data with minimal disruption
2. U.S. Pat. No. 7,809,912 Methods and systems for managing I/O requests to minimize disruption required for data migration
3. U.S. Pat. No. 7,770,053 Systems and methods for maintaining data integrity during a migration Clustering is a technique used in multiple-node computer systems to provide certain desirable functionality and characteristics from the perspective of external users. One such characteristic is high availability, generally achieved by providing redundancy that can be used to continue operations even in the face of (generally hardware) failures. Two general types of clusters are "failover" and parallel or "shared all" clusters. In parallel clusters, the storage devices are allowed to be actively accessed from all nodes (hosts) in the cluster. Synchronization is left to the applications. In a failover cluster, while all nodes can see a storage device, it can only be accessed by one node at a time. Synchronization is part of the cluster failover mechanism.

SUMMARY

It is desirable to support data migration in a failover cluster environment, but providing such support can present certain challenges. Non-disruptive migration involves several sensitive operations where input/output (I/O) is temporarily suspended and from which it is necessary to recover in a non-obtrusive manner. The fine control over I/O and the possibility of aborting and restarting at multiple steps of the process would require significant communication and coordination among the nodes of the cluster, most of it needed only for the unlikely event of a failure and therefore an inefficient use of system resources.

A method is disclosed of non-disruptively migrating contents of a source storage device to a target storage device in a data processing system having a set of host computers organized into a failover cluster. The hosts include one labeled as a migration node where an application is executing that is accessing the source device to be migrated, and the rest being labeled as failover nodes that stand ready to begin execution of an application program executing on the migration node. The source storage device is identified by the application using a device name. The method includes creating metadata indicating that a migration operation is in progress, the metadata including a roll-forward flag initially being reset and also including access control data initially set to allow access to the source storage device and disallow access to the target storage device. This metadata creation may be done as part of or in conjunction with an initial setup operation at the beginning of a migration.

Subsequently, the target storage device is synchronized to the source storage device and the target storage device is configured to each of the failover nodes. Synchronizing leads to a source-selected operating state in which read and write operations continue to be directed to the source storage device and write operations continue to be duplicated to the target storage device.

Subsequently, a commit operation is performed that causes subsequent read and write operations to be directed exclusively to the target storage device. The commit operation includes (i) setting the roll-forward flag, (ii) setting the access control data to disallow access to the source storage device and allow access to the target storage device, and (iii) changing or remapping the device name to cause the application program to access the target storage device instead of the source storage device through that device name.

The migration node is operative when the source storage device is coming online (i) if the roll-forward flag is not set, to abort the migration operation and maintain the initial setting of the access control data allowing access to the source storage device and disallowing access to the target storage device, and (ii) otherwise if the roll-forward flag is set, to ensure completion of the commit operation. Each failover node is operative when the source storage device is coming online and the roll-forward flag is set, to (i) set the access control data to disallow access to the source storage device and allow access to the target storage device, and (ii) change or remap the device name to cause an application program executing on the failover node to access the target storage device instead of the source storage device. By this operation, an interrupted migration can be completed if possible and otherwise aborted, and the failover nodes are prevented from accessing the target storage device until either a migration operation (either an initial attempt or a subsequent attempt after one or more aborts) successfully completes.

For simplicity, the migration of a single storage device is described. Generally in a real system, more than one device can be migrated at a time and more than one application could be migrated at a time. As the node labeling is used with respect to one migration, a given node may simultaneously serve as a migration node for one migration and as a failover node for another migration.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
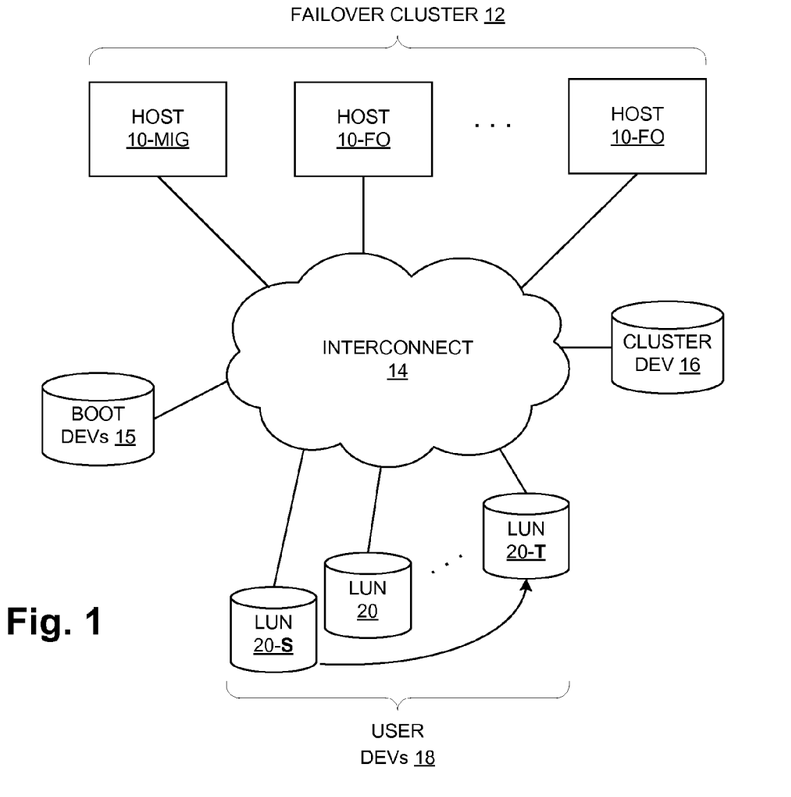
FIG. 1 is a block diagram of a data processing system.

FIG. 1 shows a data processing system having a set of host computers (HOSTs) 10 which are configured as a group referred to as a "failover cluster" 12. The hosts 10, which are also referred to as "nodes" herein, are connected by interconnect 14 to storage devices shown as one or more boot devices 15, a cluster device 16 and a set of user storage devices 18 also shown as logical units or LUNs 20. The boot device(s) 15 store programs and data used by the hosts 10 at startup time, also referred to as "boot" time. One of the hosts 10, identified as a "migration host" 10-MIG, performs a storage device migration operation described below, while the other hosts 10 are identified as failover hosts 10-FO standing ready to assume execution of one or more application programs of the migration host 10-MIG if it should fail. Details regarding failover are likewise given below. The labels "migration" and "failover" are only for convenient identification of different actors herein; there is generally no inherent "migration" or "failover" characteristic forcing any differences in kind among the hosts 10. The migration host 10-MIG is the host 10 where the application using the storage device 18 to be migrated is executing. Other applications can be running on other hosts 10, and if separate migrations are occurring for the storage of applications on the other hosts 10, then those other hosts 10 are the migration hosts with respect to those migrations.

The LUNs 20 include a source LUN 20-S and a target LUN 20-T participating in a migration operation by which the target LUN 20-T functionally replaces the source LUN 20-S in the system. It is assumed that prior to migration, the source LUN 20-S is operated as a storage resource having a resource name known to application programs executing on the hosts 10. A migration operation moves this resource to the target LUN 20-T, so that future accesses are directed to the target LUN 20-T rather than to the source LUN 20-S. Reasons for such migration of storage resources include a desire for additional capacity or improved performance, or to upgrade to more current and well-supported hardware, for example. In some cases the source LUN 20-S is to be removed from the system, although in other cases it may be maintained and reused for other purposes.

The interconnect 14 includes one or more storage-oriented networks providing pathways for data transfer among the hosts 10 and devices 16, 18. An example of the interconnect 14 is a FibreChannel storage area network (SAN), either by itself or in conjunction with Ethernet or other network components. The cluster device 16 provides storage for clustering-related data used by all the hosts 10. In some embodiments the cluster device 16 may be referred to as a "quorum disk." More generally, the cluster employs a quorum database, which may not necessarily reside on a block storage device—it may reside in so-called "cloud" storage or distributed across multiple disks. The user devices 18 are logical units of storage allocated for more general use, for example to store databases, file systems, etc. used by application programs executing on the hosts 10. Generally, the devices 16, 18 are visible to the hosts 10 as block-oriented storage devices such as disk drives.

Figure 2:
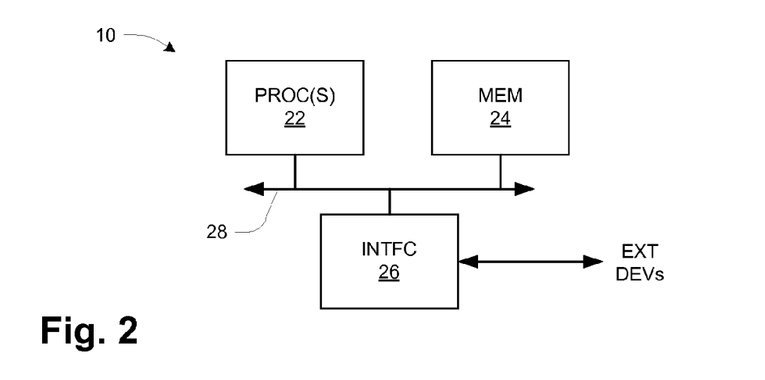
FIG. 2 is a block diagram of a hardware organization of a host.

FIG. 2 shows an example configuration of a host 10 from a hardware perspective. It includes one or more processors 22, memory 24, and interface circuitry 26 interconnected by data interconnections 28 such as one or more high-speed data buses. The interface circuitry 26 provides a hardware connection to the interconnect 14 (FIG. 1) and perhaps other external devices/connections (EXT DEVs). The processor(s) 22 with connected memory 24 may also be referred to as "processing circuitry" herein. In operation, the memory 24 stores data and instructions of an operating system and one or more application programs which are executed by the processor(s) 22 to cause the hardware to function in a corresponding manner. Thus the hardware executing the instructions of a migration tool, such as described below, can be referred to as a migration tool circuit or component, and it will be understood that a collection of such circuits or components can all be realized and interact with each other as one set of computer processing hardware executing different computer programs as generally known in the art.

Figure 3:
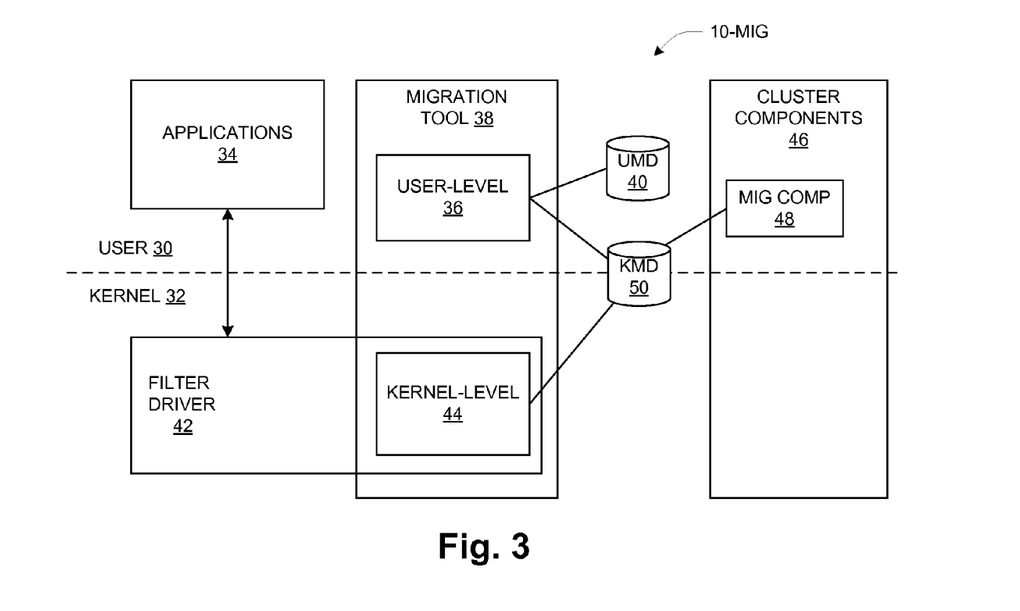
FIG. 3 is a block diagram of a software organization of a host.

FIG. 3 shows a view of the migration host 10-MIG from a software perspective, i.e., a collection of software-implemented functional components as discussed above. The operating environment is divided between unprivileged user space 30 and privileged system or kernel space 32 as generally known in the art. In user space 30 resides one or more application programs (APPLICATIONS) 34 and a user-level part 36 of a migration tool 38. The user-level part 36 has access to user metadata (UMD) 40. The kernel space 32 includes a filter driver 42 along with a kernel-level part 44 of the migration tool 38. The components also include a set of cluster components 46. As shown, the cluster components 46 include a user-space migration component (MIG COMP) 48, which is also referred to as a "migration-aware cluster component" herein. The kernel-level part 44 and migration component 48 have access to kernel metadata (KMD) 50. The KMD 50 can be written from user space 30, but is read from kernel space 32; the migration component 48 writes to the KMD 50 user space 30, and in one embodiment may use a kernel API to do so.

The application(s) 34 may be conventional user-level applications such as a web server, database application, simulation tool, etc. These access data of the user storage devices 18 (FIG. 1) using system calls as known in the art. The filter driver 42 is a component working in conjunction with a standard device driver (not shown) as part of an operating system that implements the system calls, reading and writing data to/from the user devices 18 as requested by the applications 34. The filter driver 42 may provide specialized and/or enhanced input/output functionality with respect to the user devices 18. For example, in one embodiment the filter driver 42 may be a multipathing driver having an ability to access individual LUNs 20 via multiple paths, and it manages the use of the paths for increased performance and/or availability. An example of a multipathing driver is the PowerPath® driver sold by EMC Corporation.

The migration tool 38 is a specialized application used to migrate one LUN (source LUN 20-S) to another (target LUN 20-T), as explained above and described in the above-referenced US patents. Pertinent details of the migration process are described below. The user-level part 36 carries out higher-level logic and user-facing functionality. For example, it may provide a command-line interface or command application programming interface (API) for interacting with a human or machine user that exercises control over a migration process.

In operation it uses the UMD 40 to track progress and control execution under certain conditions, as described more below. The kernel-level part 44 of the migration tool 38 performs lower-level operations, some as extensions of kernel-level operations performed by the filter driver 42. One example is duplication of writes, used to maintain synchronization between the source LUN 20-S and the target LUN 20-T as described below. Another is to prevent access to the target prior to commit and the source once the transition to committed state has occurred. The kernel-level part 44 may be realized in one embodiment as an extension component having a defined interface to a basic or core set of components of the filter driver 42.

The cluster components 46 are a set of components providing cluster-related functionality of the host 10-MIG. Examples of such functionality include cluster formation and maintenance (membership), health monitoring, and failover operation, the latter referring to the ability of one node (a host 10) to begin execution of an application when a separate node previously executing the application has failed. Failover includes tracking the state of all executing applications in a shared data structure on the cluster device 16 (FIG. 1), along with mechanisms for transferring resources from a failed node to a new or "failover" node where application execution is continuing. Such techniques are generally known in the art. The migration component 48 must be able to write into the KMD 50, which is done from user space as explained above. It must also be able to change the kernel state in the kernel level portion 44 of the migration tool 38 at the same time (explained below). The migration component 48 may be implemented as an extension or "plug-in" in the set of cluster components 46. It provides a migration-aware dimension to failover cluster operation, to properly handle certain operating conditions as described detail below In general, as part of cluster software, selected actions (such as execution of selected programs/routines) can be configured to be performed before a resource is brought "on line" on a particular node. The migration cluster component 48 is one of these actions.

A brief description of the use of the UMD 40 and KMD 50 is provided. Every time there is a state transition during a migration, the beginning of that transition is recorded in the UMD 40, which is on the migration host 10-MIG. Then a series of steps specific to that transition is executed, where each step is "idempotent" (i.e., produces the same results if executed once or multiple times). Some steps involve calling into the kernel-level component 44 to change its behavior. In general when such a step happens, there is also a call to update the KMD 50 so that the next time the host 10 reboots, the kernel-level component 44 will resume the same behavior (though there are specific exceptions to this.) Thus the KMD 50 is written from user space 30, but read from the kernel 44 when a host 10 reboots. Similar steps need to be followed for properly setting kernel and KMD state on the failover nodes 10-FO as well, but the presently disclosed technique simplifies the times the steps have to be invoked on the failover nodes 10-FO. Once all the steps for a state transition have been successfully executed, the UMD 40 is updated so that it shows the new state. If there's any interruption in this process, the UMD 40 is used to tell the system that there was a state transition happening and it needs to be attempted again. Because the steps are idempotent, it does no harm to repeat any that were already successfully executed.

While FIG. 3 is used to specifically describe the migration host 10-MIG, for present purposes the failover hosts 10-FO may be similarly arranged. The failover hosts 10-FO includes the migration component 48 in their cluster components 46, to write to portions of the KMD 50 and to perform certain migration-aware operations as described below. There is a separate KMD 50 on each host 10, private to that host 10. The migration tool 38 in conjunction with the migration cluster component 48 ensure that all the individual KMDs 50 and the kernel states on all hosts 10 are in the correct state.

The migration operation described herein is under control of one host 10 identified as the migration host 10-MIG, and the failover hosts 10-FO play a migration-aware failover role with respect thereto. The labels MIG and FO are used only for purposes of describing pertinent functionality. In general, a migration host 10-MIG also serves as a failover host with respect to other hosts 10 of the cluster 12. Also, it is possible that multiple hosts 10 in a cluster 12 have an instance of the migration tool 38 and UMD 40, meaning that each such host 10 plays the role of a migration host 10-MIG with respect to migrations under its control.

Figure 4:
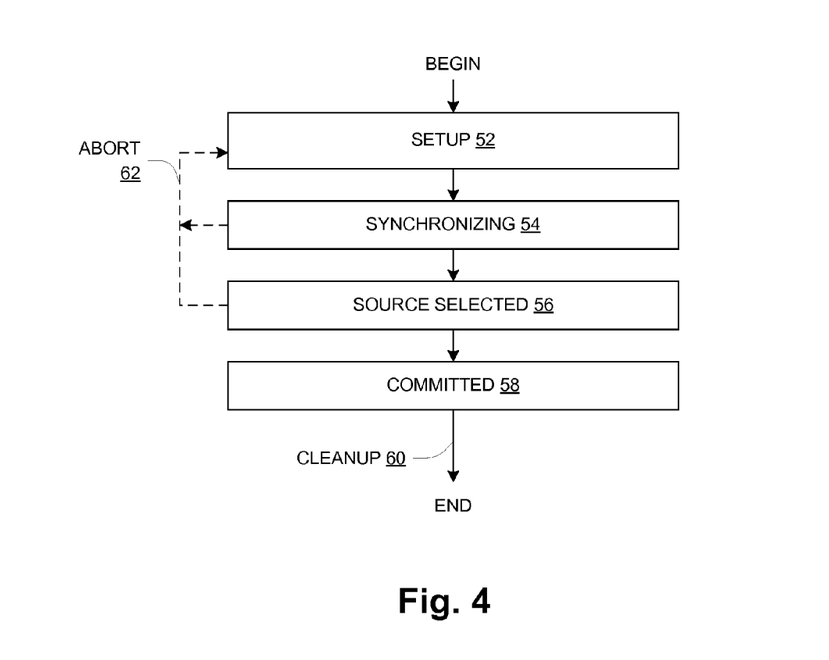
FIG. 4 is a state diagram for a migration operation.

FIG. 4 illustrates a progression of states during a migration operation. Transitions are effected in part under control of the command line interface (CLI) or command API as mentioned above. Thus the transition between successive operations, for example, may occur in response to a user's monitoring for completion of one step and commanding that the next step be performed. Suitable CLI or API commands for the process of FIG. 4 might include "Setup", "Synchronize", "Commit" and "Cleanup" for example, with specification of various parameters including identifiers of the source and target LUNs 20-S, 20-T.

It is assumed that prior to the process both the source and target LUNs 20-S, 20-T have become configured for use by the migration host 10-MIG, and that the source LUN 20-S is configured for use by the other hosts 10. Additionally, it is assumed that the contents of the source LUN 20-S are viewed as a storage "resource" having a device name used by the application(s) 34 to identify that resource as the target of an I/O operation (read or write). As known in the art, such a device name may be either location-dependent or location-independent, depending on whether the name identifies a physical location of the resource. An example of a location-dependent name is one that includes the name of a physical storage array that contains the source LUN 20-S. The name itself identifies the physical location of the target of the I/O operation. In contrast, a location-independent name is a more abstract name that at any time merely maps to a particular physical storage array, so that a translation or lookup is required in order to identify the physical location of the target of an I/O operation. An example of a location-independent name is a "pseudo-device name" as used in the PowerPath® product, such as "emcpower10". Additionally, in some operating systems, names are not used to map applications to their storage resources. The present description is directed primarily to systems employing location-independent resource naming, with identification of different processing where necessary in the case of location-dependent naming.

Referring to FIG. 4, to enter a setup state 52, the migration tool 38 configures the migration component 48 of each failover host 10-FO for the resource being migrated. An indicator or "flag" called a "roll forward flag" or RFF is created. The RFF is maintained by the cluster 12 as an instance-specific property for the migration component 48 (as are target and source device ids needed for swapping and access control). The RFF is initially in a reset or non-asserted state. The RFF is a single flag that all the hosts 10 see and that can be changed atomically with respect to all the hosts. It could be stored on the cluster device 16, for instance. There might be an optimization that stores the KMD 50 on the cluster device 16 also, but typically the KMD 50 is stored on the boot device 15 of each host 10, accessible early in boot to correctly set up the state of the kernel level portion 44.

Also, at this point or earlier, access control data in the KMD 50 is set to a value that disallows host access to the target LUN 20-T. It may be that when the target device 20-T is configured to an FO node 10-FO, that will cause the kernel migration code 44 to read the KMD 50 for that device and set the access control to prevent access to the target. Alternatively, a call into the kernel migration code 44 to set the kernel state to prohibit access to the target may be made at the time that kernel state is written into the KMD 50. The kernel migration code 44 while it doesn't yet see the target device, can put this access prohibition into place proactively.

Also at this point the target device 20-T is configured to the FO hosts 10-FO. This occurs after the access control setup described above to prevent access to these devices before the commit operation is invoked.

During the synchronizing state 54, a synchronization operation is performed in which the contents of the source LUN 20-S are copied to the target LUN 20-T so as to make the contents of the target LUN 20-T identical to the contents of the source LUN 20-S. Synchronization has two components. One is copying all the existing data as of the time of initiating synchronization, and the other is establishing ongoing duplication or "cloning" of any write operation performed on the source LUN 20-S to the target LUN 20-T as well. Synchronization is complete when all existing data has been copied and all newly written data continues to be duplicated. The copying of existing data may be done in any of a variety of fashions, which may depend in part on the exact configuration of the system and the availability of any specialized tools or functions that support such copying. In one embodiment, host-based copying may be used, in which the migration host 10-MIG performs reads to the source LUN 20-S and writes the data to the target LUN 20-T. Other techniques may employ copying using mechanisms provided by a specialized storage controller, which may be part of a storage array or subsystem and relatively independent of the hosts 10. Examples include Open Replicator for Symmetrix available from EMC Corporation. Write duplication is provided by the kernel-level portion 44 of the migration tool 38.

Once synchronization is complete, at 56 the system operates for some period with "source selected", meaning that reads to the storage resource continue to be directed to the source LUN 20-S while writes are duplicated to both the source LUN 20-S and target LUN 20-T. Generally, this phase will last only as long as necessary for the higher-level control (e.g., a storage administrator user) to command a commit operation to transition into a committed state 58, in which the target LUN 20-T is used to the exclusion of the source LUN 20-S. The source LUN 20-S is no longer synchronized with the target LUN 20-T, which continues to have the correct current data as seen by the rest of the system. The commit operation is described in detail below.

At 60, a cleanup operation is performed which can be used to remove all remaining metadata associating the source LUN 20-S with the named resource. At that point, the source LUN 20-S may be removed from the system, or it may be re-configured for another use in the system. One important task performed during cleanup is to erase any information on the source device 20-S that might cause it to be identified mistakenly as the storage resource that has been migrated to the target device 20-T. Earlier in the migration, access control prevents this "mistaken identity". Also in connection with re-use, the contents of the source LUN 20-S may be erased, perhaps with replacement by a known pattern (such as all zeros) for security or other operational reasons. The portions of the UMD 40 and KMD 50 used in connection with this migration may be deleted.

The process of FIG. 4 includes an abort path 62 leading from the synchronizing state 54 and source selected state 56 back to setup 52. Aborting may occur by user command or by automatic operation when problems are encountered during the process. For example, if either the source LUN 20-S or target LUN 20-T fails or otherwise becomes unavailable during the process, such failure may be detected either manually or automatically and lead to aborting the migration.

A device fault is a write failure to either the source or target. Since all writes are duplicated, migration can only proceed if both writes succeed. If one succeeds and the other fails, migration must be aborted. In this case, the migration will go into a "target device faulted" state at this point, and the user will have to execute the abort and start over, perhaps first curing whatever problem caused the fault. The copy process could also fail, due to a read failure on the source or a write failure on the target. This is not a "device fault", but will cause the synchronization to stop. An explanation of the handling of device faults in a non-cluster environment can be found in the above-referenced U.S. Pat. No. 7,770,053. Device fault handling in the cluster environment may be generally similar. It should be noted, though, that in the non-cluster environment as described in the '053 patent, there is a "target selected" state in addition to a source selected state, and in the target selected state reads are directed to the target device 20-T instead of the source device 20-S. When the system is shutdown unexpectedly, the non-selected side is faulted because there's no guarantee that all writes made it to both sides. Thus the source device is faulted if this occurs during operation in the target selected state. Also, if a fault happens during normal I/O, then the side that fails the write will get the fault, and therefore the source side is faulted when operating in the source selected state and a write to the source device fails. In contrast, in the cluster environment as described herein, operation proceeds directly from the source selected state 56 to the committed state 58; there is no target selected state. Only the target device 20-T is ever faulted when a write fails, no matter which side the write fails on.

Figure 5:
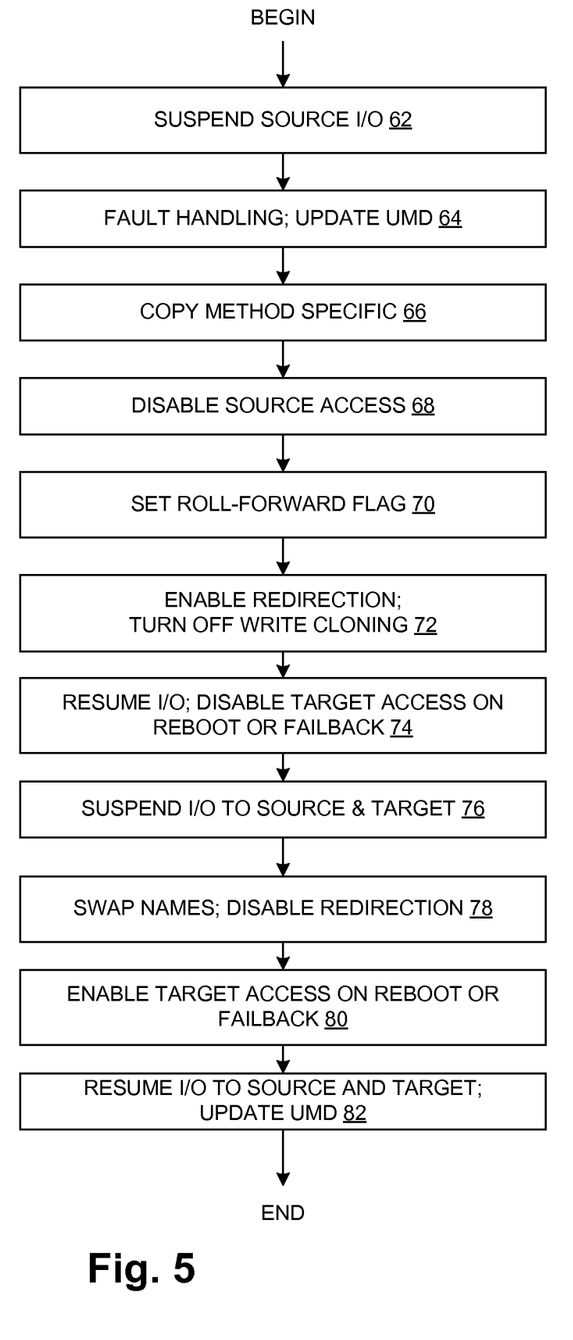
FIGS. 5-8 are flow diagrams of processes performed in connection with a migration operation.

FIG. 5 describes processing at the migration host 10-MIG for transitioning from the source selected state 56 to the committed state 58. The various steps are described in turn below.

Step 62—Suspend source I/O
  1. Suspend processing of I/O requests directed to the source device 20-S
Step 64—Fault Handling; Update UMD
  2. Check for device fault—if there is one, fail the commit; user must abort
  3. Update UMD 40 with state being transitioning to committed 58
  4. Open KMD 50
Step 66—Copy Method Specific
  5. Take actions as needed for the specific method being used for copying the data. In the case of using Host Copy, for example, remove the record of the migration from a copy daemon
Step 68—Disable source access
  6. Disable access to the source device 20-S
Step 70—Set Roll Forward Flag
  7. Set Roll Forward Flag
Step 72—Enable redirection and turn off write cloning
  8. Enable I/O redirection from source to target and target to source (2-way redirection)

9. Turn off write cloning (no longer write to source when I/O resumes)

Step 74—Resume IO and disable target access on reboot or failback

10. Resume processing of I/O requests directed to source device 20-S
11. Disallow access to target device 20-T in KMD 50. Flush KMD 50 to disk so change is seen in case of system crash
12. Access to source device 20-S is already disallowed (step 6)

Step 76—Suspend I/O to source and target

13. Suspend I/O for both source and target devices

Step 78—Swap names and disable redirection

14. Swap device names (see below)
15. Disable I/O redirection from source to target and target to source (2-way redirection)

Step 80—Enable target access on reboot or failback

16. Remove KMD record (written at 74) that disabled access to target in case of crash; target may now be accessed on reboot
17. Close KMD 50

Step 82—Resume I/O on source and target and update UMD

18. Resume I/O on target and source
19. Update UMD 40 to record completion of transition to Committed state 58

Details of a process for name swapping performed during step 78 can be found in the above-referenced U.S. Pat. No. 7,904,681. Other processes may be employed, and the nature of the process may be dictated in part by specifics of the operating system of the migration host 10-MIG.

The process of FIG. 5 as described above is specifically applicable to systems using location-independent or "pseudo-device" naming. In systems using location-dependent or "native" naming, steps 11-16 and 18 would be skipped, and the state would be CommitedAndRedirected.

Figure 6:
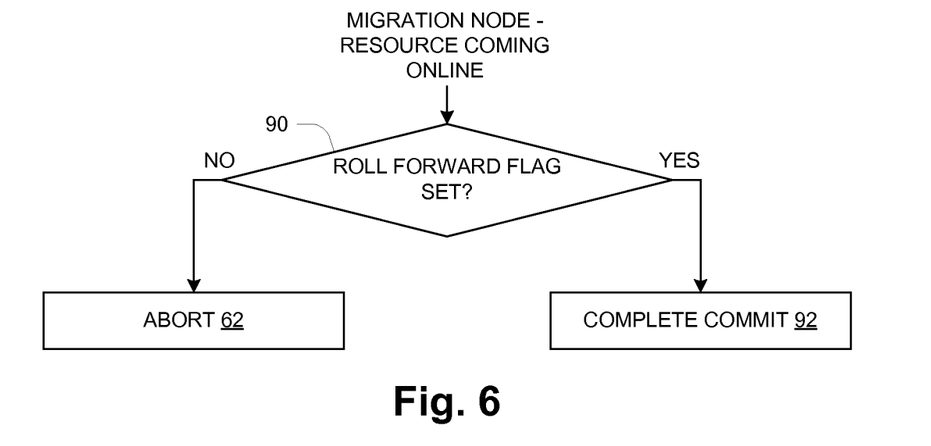

FIG. 6 illustrates operations at the migration host 10-MIG when the storage resource is "coming online", i.e., being made part of the operating environment of the host 10. This occurs during the boot or startup process, for example, which may be after a shutdown (orderly or crash) that occurred during a migration. At the migration host 10-MIG, the resource may also come online at a time of failback, i.e., when the host resumes operation and responsibility for execution of the application(s) 34 after an outage. These operations can also occur as a result of a manual failover.

Referring to FIG. 6, at 90 the user-level part 36 of the migration tool 38 ascertains whether the roll-forward flag (RFF) is still reset (not yet set). If so, then the migration is aborted at 62. Aborting avoids potential data loss, which might occur because while the host 10 was down, or the migration had failed over, data may have been written to the source, but not the target. If at 90 the roll-forward flag is set, then at 92 the process of transitioning to the committed state 58 is completed as described above, resulting in future I/O requests being directed to the target LUN 20-T. This action is not only safe at this point but required for data integrity, because writes may have already happened to just the target device 20-T.

If the RFF is not set, but the UMD 40 shows that a transition to the committed state 58 has begun, then it is necessary to perform a limited rollback and then abort the migration. Rollback involves undoing the steps covered in 66-68 of FIG. 5 (done after updating UMD 40 but before setting RFF).

Figure 7:
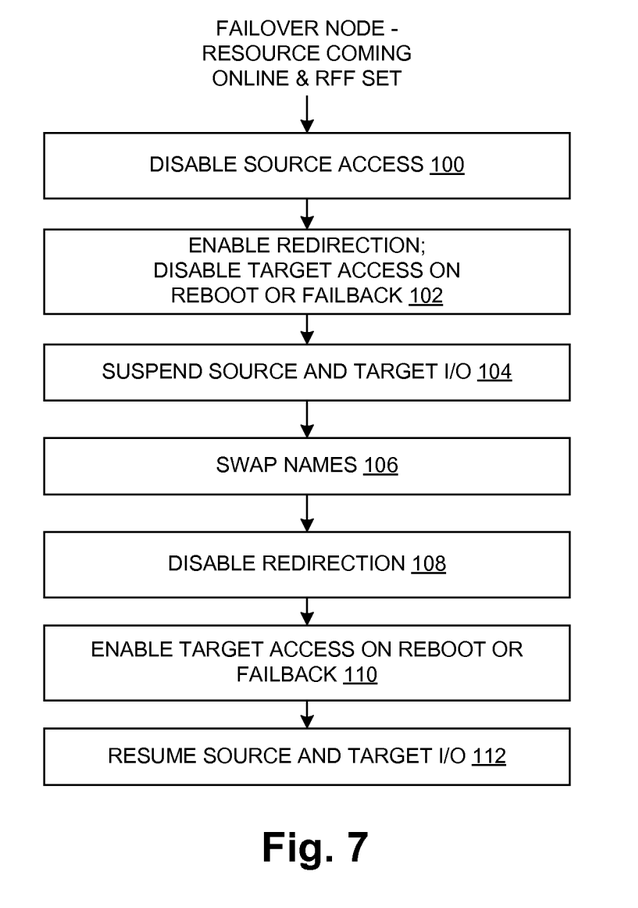

FIG. 7 shows processing at a failover node 10-FO when a resource is coming online. One aspect of this processing is that it may occur in a failover condition, i.e., when the migration host 10-MIG has crashed or otherwise become sufficiently inoperable. In this condition, it is important that a failover node 10-FO reliably know whether it should use the source LUN 20-S or the target LUN 20-T. One aspect of the problem is to ensure that if any switching to the target LUN 20-T is to occur, it must be done prior to commencing normal operation. One aspect of cluster operation is that one or more core cluster components 46 are guaranteed to execute before any application-level use of certain resources can occur, because such operation is necessary for proper cluster operation. This same mechanism of guaranteed initial execution is used advantageously to ensure coherent switching to the target LUN 20-T. The migration component 48 is configured for such guaranteed execution prior to any application-level use of the resource, and at that time it performs the processing of FIG. 7 to effect a coherent switchover to the target LUN 20-T when the RFF flag reliably indicates that such switchover should occur.

Referring to FIG. 7, steps on a failover node 20-FO with the Roll Forward Flag set are as follows:

Step 100—Disable source access

1. Open KMD 50
2. Disable access on the source device 20-S

Step 102—Enable redirection and disable target access on reboot or failback

3. Enable I/O redirection from source to target and target to source (2-way redirection)
4. Disallow access to target in KMD 50. Flush KMD to disk so the change is seen in case of system crash
5. Access to source is already disallowed (step 2).

Step 104—Suspend source and target I/O

6. Suspend I/O for both source and target devices

Step 106—Swap names

7. Swap devices

Step 108—Disable redirection

8. Disable I/O redirection from source to target and target to source (2-way redirection)

Step 110—Enable target access on reboot or failback

9. Remove KMD record (written in Step 5) that disabled access to target in case of crash
10. Close KMD Step 112—Resume source and target I/O 11. Resume I/O on target and source For systems using native resource naming, steps 4-9 and 11 would be skipped. Further steps, not described herein, are necessary on the FO nodes 10-FO (to remove redirection) when the application is reconfigured.

Figure 8:
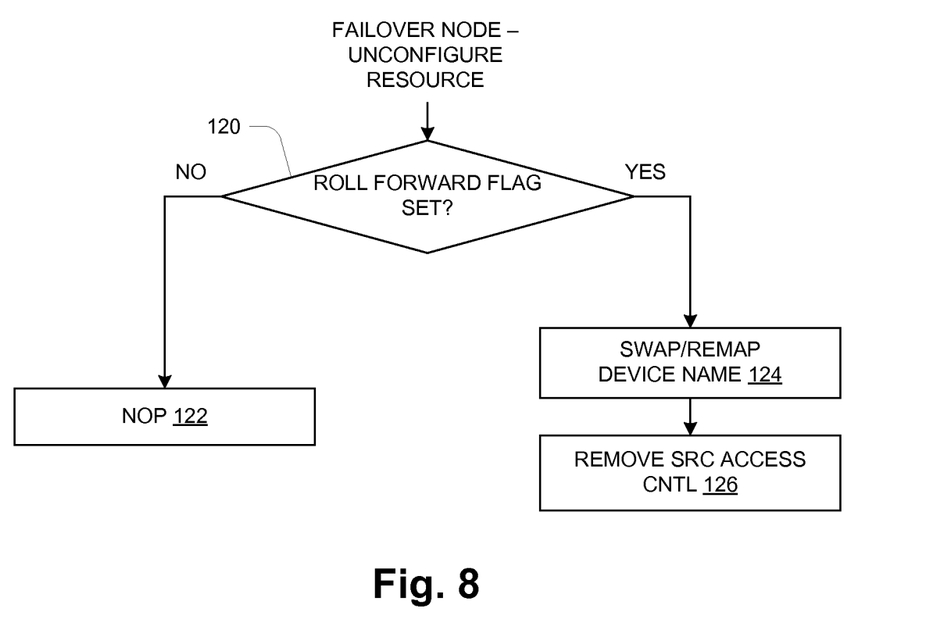

FIG. 8 illustrates operation at a failover host 10-FO when a storage resource is unconfigured, i.e., removed from the operating environment of the host. At 120 the roll-forward flag is tested, and if it is not set then no action is taken (NOP 122). If the roll-forward flag is set, then operation proceeds to steps 124-126. At 124, the device name is swapped. At 126, the source access control metadata is removed from KMD 50. It will be appreciated that in many cases the name/mapping swap may have already previously occurred, and therefore the swap at 124 is effectively no action. A swapping done for a given migration is a unidirectional or "idempotent" operation, meaning that it is always setting the name or mapping to point to the target LUN 20-T irrespective of whether the name or mapping already does so. By having an idempotent characteristic, the swap operation ensures one consistent result even when performed multiple times.

While various embodiments have been particularly shown and described, it will be understood by those skilled in the art that various changes in form and details may be made therein without departing from the scope of the invention as defined by the appended claims.

What is claimed is:

1. A method of non-disruptively migrating contents of a source storage device to a target storage device in a data processing system having a set of host computers organized into a failover cluster, the host computers including a migration node and one or more failover nodes, the migration node executing an application program accessing the source storage device via a device name, each failover node being operative to begin execution of the application program upon failure of the migration node, comprising:
   creating metadata and a roll-forward flag, the metadata indicating that a migration operation is in progress, the roll-forward flag initially being reset, the metadata also including access control data initially set to allow access to the source storage device and disallow access to the target storage device;
   subsequently synchronizing the target storage device to the source storage device and configuring the target storage device to each of the failover nodes, the synchronizing leading to a source-selected operating state in which read and write operations continue to be directed to the source storage device and write operations are also duplicated to the target storage device; and
   subsequently performing a commit operation causing subsequent read and write operations to be directed exclusively to the target storage device, the commit operation including (i) setting the roll-forward flag, (ii) setting the access control data to disallow access to the source storage device and allow access to the target storage device, and (iii) changing or remapping the device name to cause the application program to access the target storage device instead of the source storage device;
   wherein the migration node is operative when the source storage device is coming online (i) if the roll-forward flag is not set, to abort the migration operation and maintain the initial setting of the access control data allowing access to the source storage device and disallowing access to the target storage device, and (ii) otherwise if the roll-forward flag is set, to ensure completion of the commit operation;
   and wherein each failover node is operative when the source storage device is coming online and the roll-forward flag is set, to (i) set the access control data to disallow access to the source storage device and allow access to the target storage device, and (ii) change or remap the device name to cause an application program executing on the failover node to access the target storage device instead of the source storage device.

2. A method according to claim 1, wherein each host includes a filter driver and a set of clustering components, the filter driver including a kernel-level part performing a privileged part of a migration tool used to control the migrating operation, the cluster component including a migration-aware cluster component executed prior to application use of the source storage device, and wherein the metadata includes kernel metadata accessed by the kernel-level part of the filter driver and the migration component to set and test the value of the access control data.

3. A method according to claim 2, wherein the migration node further includes a user-level part of the migration tool having access to user metadata used to persistently track progress of the migration operation across restarts of the migration host.

4. A method according to claim 1, further including configuring the target storage device to the failover nodes at a time prior to the commit operation when the access control data disallows host access to the target storage device.

5. A method according to claim 4, further including explicitly initiating a reading of the access control data by each failover node prior to configuring the target storage device to the failover nodes to ensure each of the failover nodes is prevented from accessing the target storage device.

6. A method according to claim 1, wherein the commit operation is commenced from the source selected operating state.

7. A method according to claim 1, further including a cleanup operation subsequent to the commit operation, the cleanup operation including unconfiguring the source storage device from each host computer and removing the roll-forward flag.

8. A computerized device operable as a migration node in a set of host computers organized into a failover cluster, the host computers also including one or more failover nodes, the migration node executing an application program accessing a source storage device via a device name, each failover node being operative to begin execution of the application program upon failure of the migration node, comprising:
   memory storing computer program instructions;
   one or more processors;
   input/output interface circuitry for connecting the computerized device to the other host computers and to the source storage device and to a target storage device; and
   interconnect circuitry coupling the memory, processors and input/output interface circuitry together,
   wherein the processors are operative to execute the computer program instructions from the memory to cause the computerized device to non-disruptively migrate contents of the source storage device to the target storage device by:
      creating metadata and a roll-forward flag, the metadata indicating that a migration operation is in progress, the roll-forward flag initially being reset, the metadata also including access control data initially set to allow access to the source storage device and disallow access to the target storage device;
      subsequently synchronizing the target storage device to the source storage device, the synchronizing leading to a source-selected operating state in which read and write operations continue to be directed to the source storage device and write operations are also duplicated to the target storage device; and
      subsequently performing a commit operation causing subsequent read and write operations to be directed exclusively to the target storage device, the commit operation including (i) setting the roll-forward flag, (ii) setting the access control data to disallow access to the source storage device and allow access to the target storage device, and (iii) changing or remapping the device name to cause the application program to access the target storage device instead of the source storage device;
      wherein the migration node is operative when the source storage device is coming online (i) if the roll-forward flag is not set, to abort the migration operation and maintain the initial setting of the access control data allowing access to the source storage device and disallowing access to the target storage device, and (ii) otherwise if the roll-forward flag is set, to ensure completion of the commit operation;

and wherein each failover node is operative when the source storage device is coming online and the roll-forward flag is set, to (i) set the access control data to disallow access to the source storage device and allow access to the target storage device, and (ii) change or remap the device name to cause an application program executing on the failover node to access the target storage device instead of the source storage device.

9. A computerized device according to claim 8, wherein each host includes a filter driver and a set of clustering components, the filter driver including a kernel-level part performing a privileged part of a migration tool used to control the migrating operation, the cluster component including a migration-aware cluster component executed prior to application use of the source storage device, and wherein the metadata includes kernel metadata accessed by the kernel-level part of the filter driver and the migration component to set and test the value of the access control data.

10. A computerized device according to claim 9, wherein the migration node further includes a user-level part of the migration tool having access to user metadata used to persistently track progress of the migration operation across restarts of the migration host.

11. A computerized device according to claim 8, wherein the target storage device is configured to the failover nodes at a time prior to the commit operation when the access control data disallows host access to the target storage device.

12. A computerized device according to claim 11, wherein configuring the target device at each failover node is preceded by an explicit reading of the access control data at each failover node to ensure each of the failover nodes is prevented from accessing the target storage device.

13. A computerized device according to claim 8, wherein the commit operation is commenced from the source selected operating state.

14. A computerized device according to claim 8, wherein the commit operation is followed by a cleanup operation, the cleanup operation including unconfiguring the source storage device from each host computer and removing the roll-forward flag.

* * * * *